Figure 1:
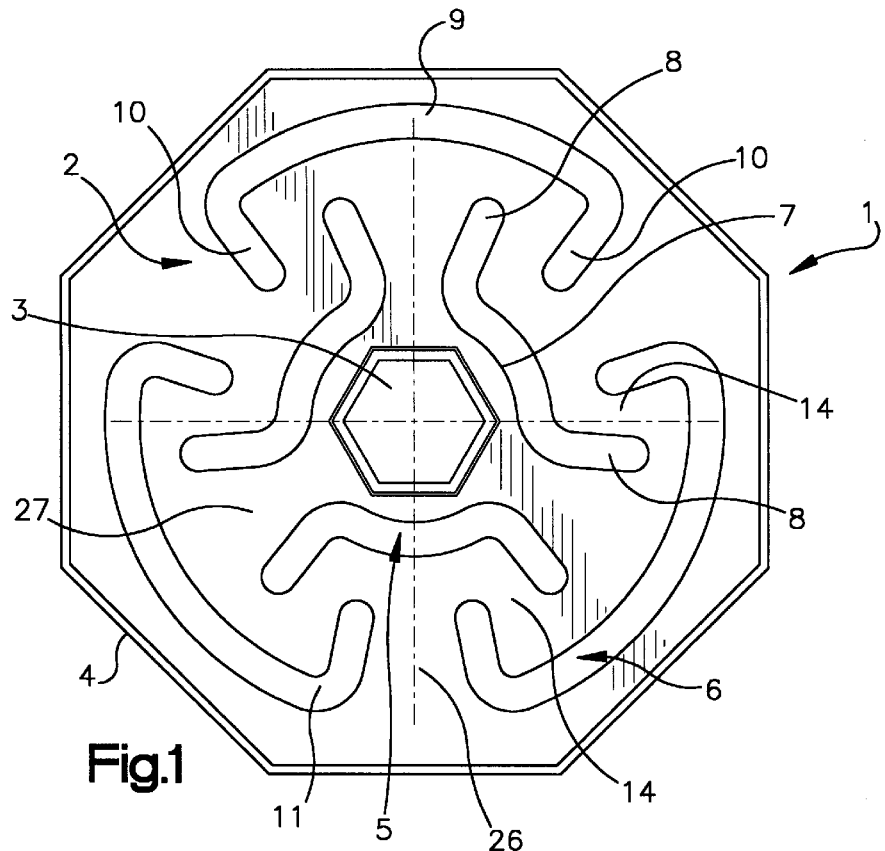

United States Patent [19]
Dorr

[11] Patent Number: 5,810,669
[45] Date of Patent: Sep. 22, 1998

[54] COUPLING SPRING ELEMENT FOR INTERCONNECTING SHAFTS

[75] Inventor: Christoph Dorr, Meerbusch, Germany

[73] Assignee: TRW Fahrwerksysteme Gmbh & Co. KG, Dusseldorf, Germany

[21] Appl. No.: 745,430

[22] Filed: Nov. 12, 1996

[30] Foreign Application Priority Data

Nov. 11, 1995 [DE] Germany ................ 195 42 072.1

[51] Int. Cl.$^6$ ................................................ F16D 3/52
[52] U.S. Cl. .................... 464/98; 464/147; 464/162
[58] Field of Search .................. 464/98, 162, 147, 464/99, 81

[56] References Cited

U.S. PATENT DOCUMENTS

| | | | |
|---|---|---|---|
| 1,460,212 | 6/1923 | Olive | 464/98 |
| 2,855,767 | 10/1958 | Ahlen . | |
| 3,788,099 | 1/1974 | Miller | 464/98 |
| 4,523,916 | 6/1985 | Kizler et al. | 464/98 |
| 4,741,722 | 5/1988 | Federn . | |
| 4,776,824 | 10/1988 | Barth | 464/98 |
| 5,295,912 | 3/1994 | Muller et al. | 464/98 X |
| 5,586,938 | 12/1996 | Schurhorster | 464/98 X |

FOREIGN PATENT DOCUMENTS

| | | |
|---|---|---|
| 395639 | 6/1992 | Austria . |
| 0610979A1 | of 0000 | European Pat. Off. . |
| 0498235 | 8/1992 | European Pat. Off. . |
| 2834070A1 | of 0000 | Germany . |
| 9101314.3 | of 0000 | Germany . |
| 4220049 | 12/1993 | Germany . |
| 366921 | 3/1991 | Japan . |
| 404285321 | 10/1992 | Japan .................... 464/98 |
| 236150 | 1/1969 | U.S.S.R. ................. 464/98 |

*Primary Examiner*—Donald P. Walsh
*Assistant Examiner*—Emmanuel M. Marcelo
*Attorney, Agent, or Firm*—Tarolli, Sundheim, Covell, Tummino & Szabo

[57] ABSTRACT

A coupling spring element is provided for which assembly without access and with no play, and a torsion-proof transmission of shaft revolutions is possible and has superior spring elastic properties to which, a plate-shaped element is provided with an essentially central connection region for connection to one shaft and a connection region formed at the outer circumferential region for connection to one additional shaft, and has slot-like recesses between the two connection regions.

30 Claims, 3 Drawing Sheets

COUPLING SPRING ELEMENT FOR INTERCONNECTING SHAFTS

BACKGROUND OF THE INVENTION

The invention pertains to a coupling spring element with axially elastic properties for connecting shafts in torsion-proof fashion.

Coupling spring elements that have axially elastic properties and serve for connecting shafts are used in instances in which shaft revolutions need to be transmitted in torsion-proof fashion and with the least possible play, but in which at least a slight axial elasticity is required.

One example of this is when the assembly space for the shaft coupling is confined. The compressed axially elastic coupling should be mountable and, after release, connectable torsion proof and without play with both shafts. Coupling elements of this type are not known from the prior art.

An example of another conceivable case is the torsion-proof and axially elastic installation of shaft position sensors. Such sensors comprise a shaft with elements that are variable with respect to rotationally rigid counterelements. Until now, the connection of such sensors took place by means of a sheet metal plate that has semicircular recesses concentric to the plate center, which is arranged between the central shaft of the sensor and the shaft to be monitored. A screw connection or rivet connection for the connection of the plate to one of the shafts is provided in the center, with corresponding opposing connections for the other shaft being provided on the plate edge. The central region and the edge region are respectively bent in an opposite direction with reference to the plane of the plate. Sheet metal plate connections of this type provide neither axial elasticity nor are they torsion-proof.

One additional remarkable disadvantage of known systems is the access required for assembly. This problem arises where the assembly must be access free, for example, when correspondingly furnished systems must be sealed for cost and assembly efficiency. In this case, it is desirable to attach the parts to one another after the preassembly without additional access to the assembly region being required.

A requirement basically exists in a range of relevant technologies for coupling spring elements that are easily assembled, with the least possible construction space requirement, which can transfer shaft revolutions with the least play and as torsion-proof as possible and have axially elastic properties.

Consequently, the present invention is based on the objectives of making available this type of coupling element and with it, disclosing its range of application, which undergoes an inventive broadening by means of the coupling spring element.

The technical solution to the coupling spring element is attained by a plate-shaped element that has an essentially central connection region for connections of a shaft and an outer circumferentially shaped connection region for connection to an additional shaft, whereby slot-like recesses are formed between both connection regions.

The connection regions of the coupling spring element in accordance with the invention are formed for direct connection to a shaft and can act together with complementary formation in the leading edge region of the respective shaft. Consequently, access free assembly is possible, whereby complete freedom from play can be simultaneously ensured. In addition, a high degree of torsional rigidity is attained by means of only slot-like recesses and the respective desired axially elastic spring properties are provided.

In accordance to one advantageous proposal of the invention, the connection regions can be toothed or formed into polyhedral regions. Especially advantageous are trihedral or hexahedral combinations whereby the central connection region and the outer connection region are arranged concentric to one another. The connection regions are in an advantageous fashion provided with an edge in the axial direction, which also from tubular pieces with corresponding cross sections, whereby these axial edges of the central connection regions and the outer connection regions in accordance with one proposal of the invention are formed in a respective opposed axial direction. Finally, in accordance with one proposal of the invention, at least one of the tubular piece type connection regions is conically shaped.

On one hand, due to the formation of the connection regions in accordance with the invention, access-free assembly is possible, and, on the other hand, a connection between the shafts with no play.

The slot-like recesses formed between the two connection regions form a spring system. The slot-like recesses are arranged in circular planes concentric to the central connection region. One essential form of the invention is characterized in that slot-like recesses with a W-shape are arranged in a first circular plane around the central connection region, whereby the bases of the respective W's are arranged horizontal to the central connection region. Furthermore, in an advantageous manner, one additional circular plane that lies farther toward the outside than the first-mentioned is provided with essentially U-shaped slots, the bases of which point toward the outer connection region. The legs of the U-shaped slots overlap the legs of the W-shaped slots. Consequently, the invention defines a concrete spring system which is formed by a defined arrangement of slots with a defined configuration. The spring characteristics can be varied by means of variation of the position and the slot thickness or of the width of certain slot regions, without significantly impairing the torsional rigidity of the coupling spring element.

In an advantageous manner, the connection of the connection region on the outer circumference of the coupling spring element with the shaft has a depression formed on its surface. Through this measure, the axial elasticity of the coupling spring element can also be utilized in the direction of this shaft.

Furthermore, in an advantageous manner, the central connection region is connected with a shaft, its surface has a dome shape so that the axially elastic properties can also be utilized in this direction.

The coupling spring element according to the invention can be utilized for connection of a shaft to a shaft position sensor, whereby, in particular, all sources of error on the basis of play or lack of torsional rigidity are avoidable. The output shaft of a power steering valve can be connected in a particularly advantageous manner with the shaft of a shaft position sensor with the coupling spring element in accordance with the invention.

The coupling spring element in accordance with the invention is advantageously manufactured of sheet metal, with particular advantage as stamping and punched and deep-drawn parts.

The coupling spring element in accordance with the invention is characterized by very simple and inexpensive construction, so that it is producible in large quantities in a simple manner as stamping and deep-drawn part. It can also be assembled in a space saving manner in narrow and access free assembly areas. In this case, the connection without play takes place by means of conical, polyhedral regions which are formed like tubular or bell-shaped pieces, whereby the axial spring force also positions the coupling spring element in its working position over a long service life without additional fastening. As opposed to the hexahedral regions, e.g., the trihedral regions are not mechanically redundant.

The special slotting multiplies the spring length and compensates radial displacements. Consequently, one maintains a very large spring travel and soft spring characteristics with limited radial dimensions. The coupling spring element according to the invention also provides a closed, torsion-proof contour that, in operation has no movement relative to the bearing surfaces during the spring deflection. The slots in accordance with the invention, on one hand, assists the spring characteristics in the axial direction, an on the other hand, the proportionally high torsional rigidity.

In certain instances, it may be desirable to utilize a so-called frog effect in order to attain symmetric spring characteristics during an excursion from the central position in both directions.

The possibilities for utilizing the coupling spring element according to the invention are diverse. On one hand, assembly without additional fasteners can take place, for example, by utilization of the axial spring effect in narrow assembly spaces. In addition, dynamic axial changes in the shaft spacing and radial as well as angular offsets are absorbed or compensated. Moreover, assembly without access as well as automatic assembly by means of latching is possible, whereby, in particular, freedom from play is ensured over long operating times by means of automatic readjusting effects.

If the frog effect described is not desired, it can be eliminated, for example, by introducing an undulation. Thereby the rigidity of the spring can be decreased or generally influenced and the stress on the materials can be decreased. The durability or the service life of the coupling spring element can thereby be considerably improved.

One especially essential invention in the range of uses of the coupling spring elements is cited in the field of power steering valves, where, for example, an output shaft can be connected with a coupling spring element in accordance with the invention with a shaft position sensor. Consequently, it is therefore possible, for example, to obtain information about the shaft revolutions. Besides to the previously described properties of the coupling spring element, this application also requires an axial spring force that acts on the sensor shaft and is available from the coupling spring element.

Figure 2:
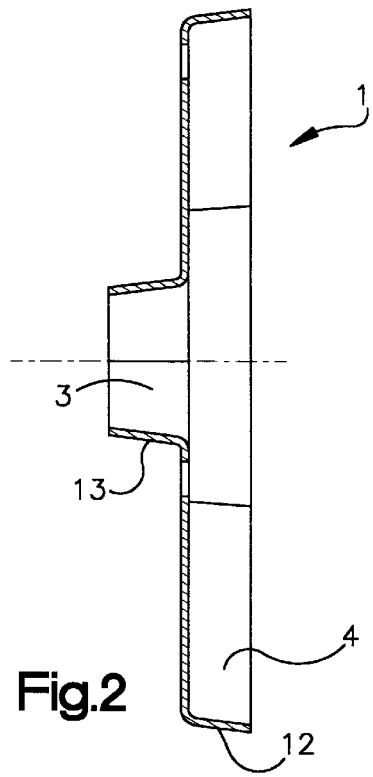
Figure 3:
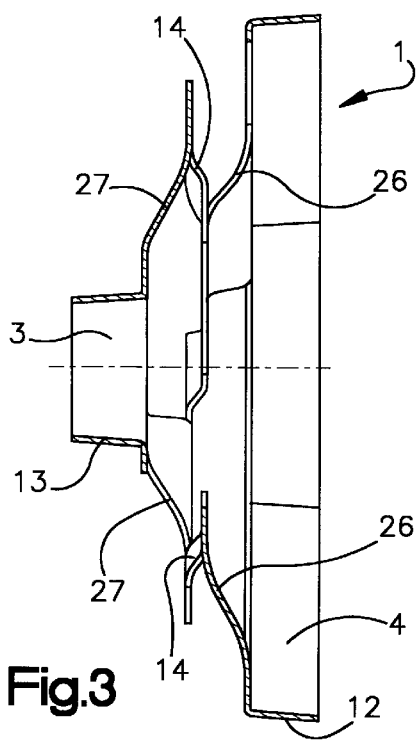
Figure 5:
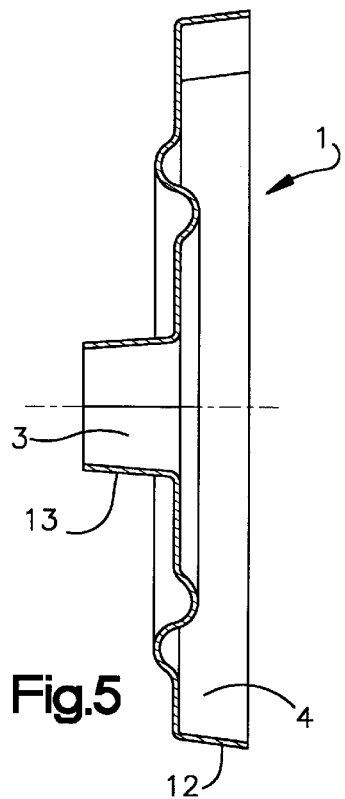
Figure 4:
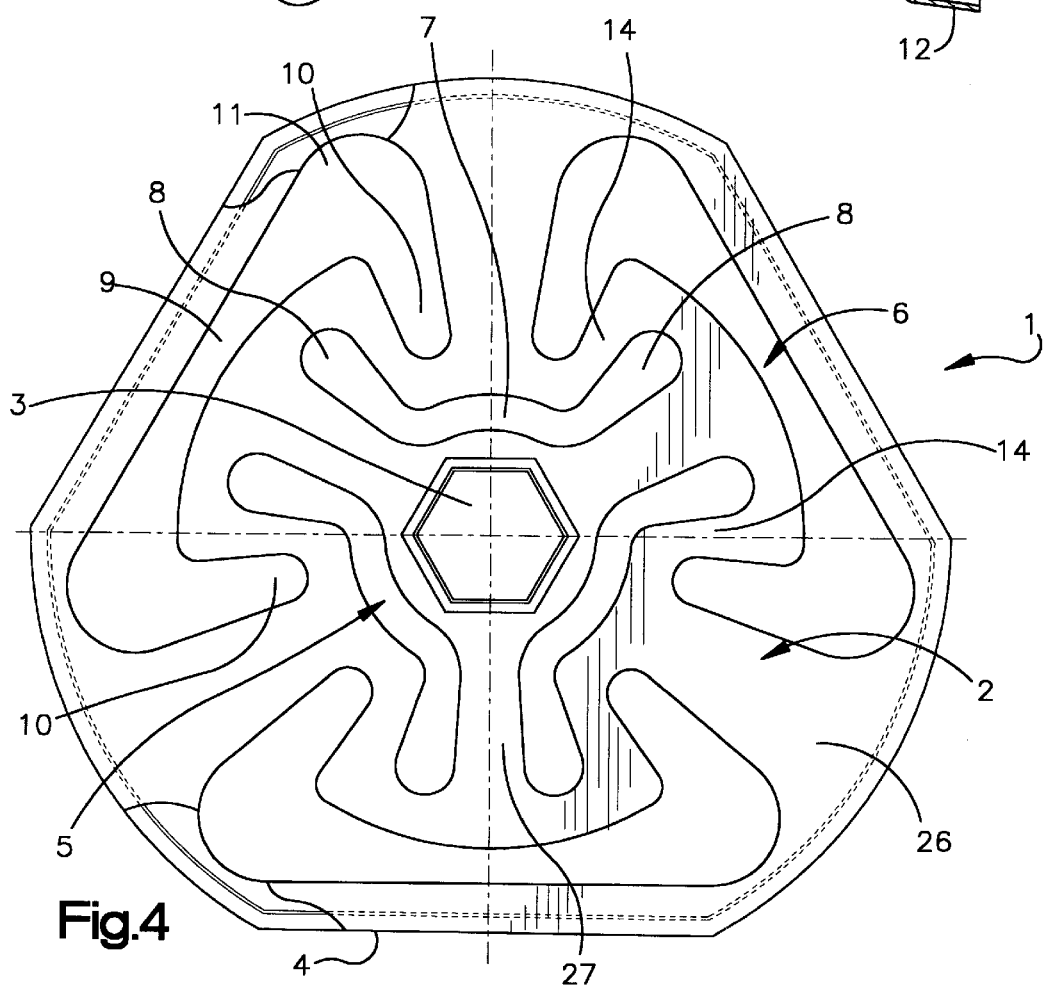
Figure 6:
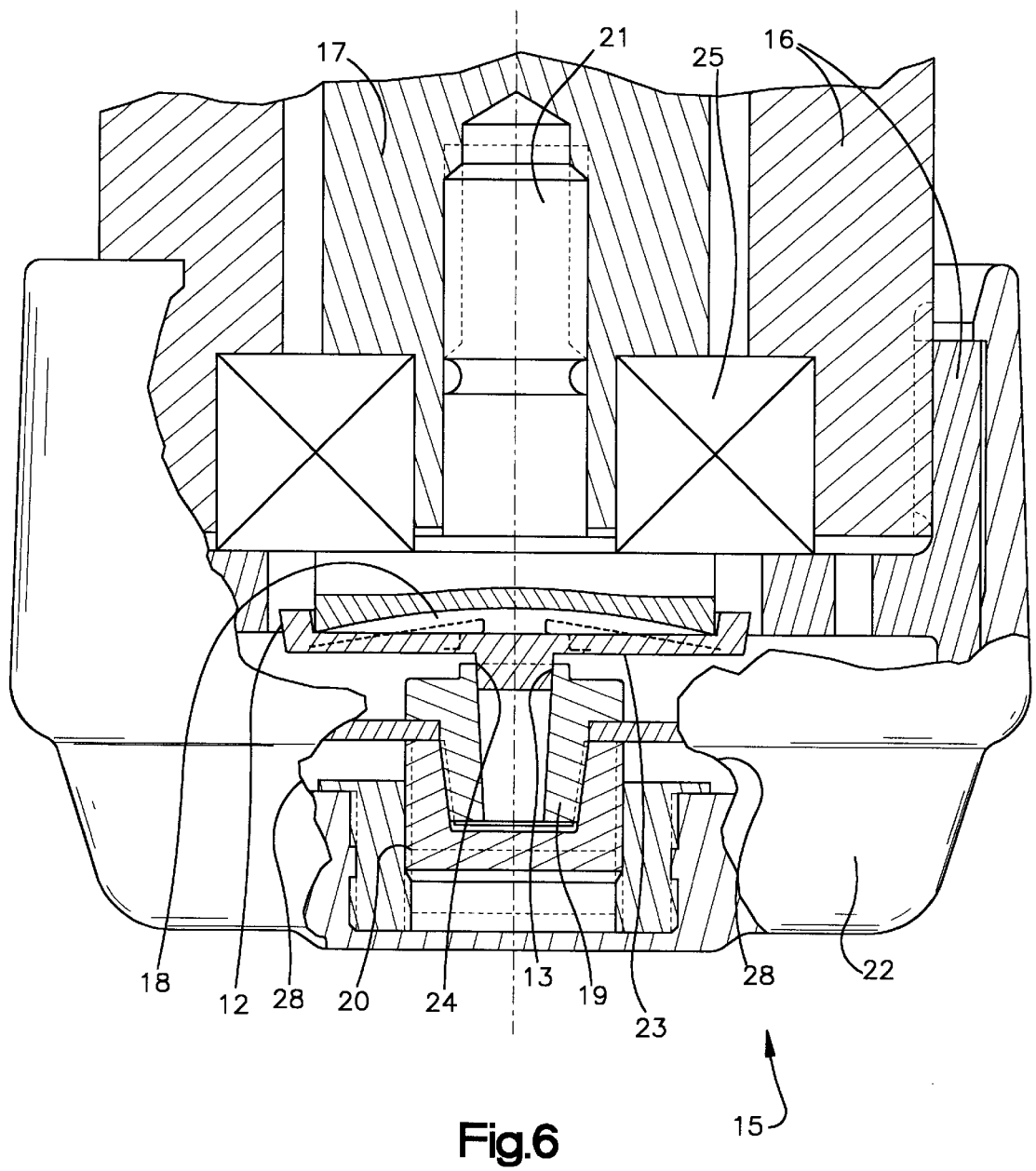

Additional advantages and characteristics of the invention are revealed in the following description on the basis of the figures. These are shown:

FIG. 1, a top view of one embodiment example for a coupling spring element;

FIG. 2, a section through the spring element in accordance with FIG. 1 in an intermediate manufacturing step;

FIG. 3, a section through the finished spring element in accordance with FIG. 1;

FIG. 4, an alternative embodiment example of a coupling spring element;

FIG. 5, a section corresponding to that of FIG. 2 through an alternative coupling spring element, and FIG. 6, a schematic representation of one application example of a coupling spring element.

In the first embodiment example shown in FIGS. 1–3, the coupling spring element 1 is formed by a plate 2 preferably a part stamped from a sheet metal plate. The sheet metal plate 2 has an inner or central connection region 3 and an outer connection region 4 which can be formed by deep-drawing the plane sheet metal plate. In the embodiment shown, the central connection region is formed as an inner hexagon and the outer connection region is formed into an exterior octagon. W-shaped slots 5 are arranged in a first, inner circular plane, with U-shaped slots 6 being arranged in a second, outer circular plane. The respective bases 7 of the W-shaped slots 5 point toward the central connection region such that the legs 8 of the W-shaped slot point outward in the direction of the outer connection region.

The bases 9 of each U-shaped leg point toward the outer connection region, with the legs 10 of the U-shaped slots 6 pointing toward the central connection region. The U-shaped slots overlap the legs of the W-shaped slots. Consequently, webs 14 are formed between the legs 8 and 10, webs 27 are formed between the legs 8 of two adjacent W-shaped slots 5, and webs 26 that are sufficiently strong for ensuring the torsional rigidity are formed between the legs 10 of two adjacent U-shaped slots 6. The spring characteristic is influenced by the number and shape of the slots. The shape can, for example, be varied with respect to the radii 11, the width of the slots, the length of the legs, etc..

FIG. 2 shows a side view of the spring element during an intermediate manufacturing step, namely in a position in which the slots are punched out, but the spring element is not yet drawn-out into the axial shape shown in FIG. 3 and hardened.

FIGS. 2 and 3 show that the central connection region 3 and the outer connection region 4 are provided with an axially extending edge 12 or 13, respectively, with said edges having the shape of a pipe section. The edges are conically formed so as to make it possible to connect said edges to corresponding counter elements without play during the positive press fitting process. The function of the webs 14, 26, 27 becomes quite obvious once the component is in the drawn-out position according to FIG. 3 and ready to be mounted. The slots and the webs define the spring characteristics and influence the torsional rigidity.

In the embodiment example shown in FIG. 4, the contour of the W-shaped and U-shaped slots as well as the outer circumference and the connection region are varied. Due to this measure, different spring characteristics are attained and the freeness of play as well as the possibility to mount the coupling spring element without requiring access are improved due to the changed outer contour. Due to the variation of the connection region from an octagon or hexagon to a trihedron, the usable length of the spring is increased while the radial dimensions remain identical. In addition, a deformation of the axially extending edge 12 is possible during spring deflection without influencing the freeness of play during the transmission of rotary movements. In other respects, identical elements are identified by identical reference numerals.

FIG. 5 shows an embodiment variant in which an undulation is produced during the manufacturing step before the coupling is axially drawn-out. This undulation increases the axial elasticity and reduces or prevents a so-called frog effect. The term frog effect refers to a spring characteristic that has a sinusoidal progression with a local maximum and minimum. This progression of the spring characteristic is desirable for certain applications because a symmetric progression of the spring characteristics in both directions is attained within the region of the local minimum or maximum if a static prestress is present. The exact progression of the spring characteristic can be adapted to the respective requirements by varying the U-shaped and W-shaped slots.

FIG. 6 shows one area of application. In this case, the coupling spring element that is identified by the reference numeral 23 in FIG. 6 is used in connection with a power steering valve 15. The sensor housing 22 that is fastened to the power steering valve housing 16 is sectioned along the line 28 within certain regions. The power steering valve 15 comprises a housing 16. In the embodiment example shown, an output shaft 17 that is inserted into a bearing/seal unit 25 is arranged in the aforementioned housing, of which one end is shown in this figure. The surface end of the output shaft 17 is provided with a screw 21 that has a depression 18. The screw 21 has a hexagonal cross section that corresponds to the contour of the outer connection region 12 of the coupling spring element 23 within the region of its surface end. Due to the conical design of the connection region 12 and the spring effect, the coupling spring element is latched in the assembly position on the surface end of the screw 21 during the assembly of the sensor housing 22 to the housing 16, namely without requiring access to the assembly region and without play.

In the embodiment example shown, a shaft position sensor 19 needs to be connected to the surface end of the output shaft 17. This shaft position sensor 19 is provided with a threaded spindle such that shaft revolutions cause an axial movement of the sensors 19. Since an electric contact by means of the thread is desired, a certain axial force needs to be exerted in order to continuously hold the thread 20 in electrically conducting contact. This axial force is provided by the axial elasticity of the coupling spring element 23. This coupling spring element 23 is shown in different positions. The position illustrated in broken lines shows a coupling spring element that is pressed into the surface depression 18. In this case, the coupling spring element simultaneously covers the dome 24 on the surface of the position sensor 19.

The central connection region that is formed a simple axial edge 13 and has a polyhedral shape is inserted into an opening in the surface which has a congruent cross section. Due to the conical the axial edge 13, a simple assembly without play is realized by pressing the coupling spring element into the opening of the position sensor 19 before the sensor housing 22 with all its individual components is attached to the power steering valve housing 16 by means of a snap connection.

In the embodiment example in accordance with FIG. 6, a simple preassembly of the elements suffices, i.e., no additional access is required for attaining a defined positioning when the components are pressed together. The coupling spring element is able to compensate for a certain axial, radial or angular offset. In addition, the coupling spring element 23 is able to transmit rotary movements of the output shaft 17 without play and in torsion-proof fashion while still providing the required axial elasticity required for the use with a position sensor 19.

The present invention is not limited by the described embodiment examples of the coupling spring element or the described applications example although characteristics essential to the invention both with respect to the form and also concrete applications shown in FIG. 6 are revealed.

LIST OF REFERENCE NUMERALS

1 Coupling spring element
2 Plate
3 Central connection region
4 Outer connection region
5 W-slot
6 U-slot
7 W-base
8 W-leg
9 U-base
10 U-leg
11 Radius
12 Axial edge
13 Axial edge
14 Web
15 Power steering valve
16 Housing
17 Output shaft
18 Surface depression
19 Position sensor
20 Threaded spindle
21 Screw
22 Sensor housing
23 Coupling spring element
24 Surface dome
25 Bearing/seal unit
26 Web
27 Web
28 Section line Having described the invention, the following is claimed:

1. An apparatus comprising:
a power steering valve having an output shaft;
a shaft position sensor having a shaft portion; and
a spring coupling element having axially elastic properties connecting said output shaft and said shaft portion of said position sensor, said spring coupling element providing a torsion-proof connection between said shafts, said spring coupling element comprising a plate-shaped element including a central connection region connected to one of said shafts and an outer circumferential connection region connected to the other of said shafts, said plate-shaped element further including a plurality of slots formed between said connection regions.

2. The apparatus of claim 1 wherein at least one of said connecting regions is polyhedral.

3. The apparatus of claim 2 wherein at least one of said connecting regions is a trihedron.

4. The apparatus of claim 2 wherein at least one of said connecting regions is a hexahedron.

5. The apparatus of claim 1 wherein at least one of said connecting regions includes a generally axially extending edge.

6. The apparatus of claim 5 wherein said central connecting region has a generally axially extending first edge and said outer circumferential connecting region has a generally axially extending second edge, said first and second edges extending in generally opposite directions.

7. The apparatus of claim 5 wherein said generally axially extending edge has a conical shape.

8. The apparatus of claim 1 wherein said plurality of slots includes a plurality of W-shaped slots uniformly distributed on the circumference of a circular plane.

9. The apparatus of claim 8 wherein said plurality of slots includes a plurality of U-shaped slots uniformly distributed on the circumference of another circular plane.

10. The apparatus of claim 9 wherein said U-shaped slots have legs which overlap legs of said W-shaped slots.

11. An apparatus comprising:
a first drive member;
a second drive member; and
a coupling spring element drivingly interconnecting said first and second members and transmitting torque therebetween, said coupling spring element comprising:
a central portion drivingly connected with one of said members;
a peripheral portion drivingly connected with the other of said members; and
a connecting portion interconnecting said central portion and said peripheral portion and having slots therethrough, said connection portion being axially elastic to enable said central portion and said peripheral portion to be resiliently displaced axially relative to each other,
said peripheral portion including a first conical surface which is radially resilient and which radially engages said other of said members to provide a torque transmitting relationship with said other of said members.

12. The apparatus of claim 11 wherein said first member comprises an output shaft of a power steering valve.

13. The apparatus of claim 12 wherein said second member comprises a shaft portion of a shaft position sensor.

14. The apparatus of claim 11 wherein said central portion includes a second conical surface which is radially resilient and which radially engages said one of said members to provide a torque transmitting relationship with said one of said members.

15. The apparatus of claim 14 wherein said first conical surface faces radially inward.

16. The apparatus of claim 15 wherein said second conical surface faces radially outward.

17. The apparatus of claim 11 wherein at least one of said central portion and said peripheral portion has a polyhedral cross-section.

18. The apparatus of claim 17 wherein said at least one of said central portion and said peripheral portion has a hexagonal cross-section.

19. The apparatus of claim 18 wherein said peripheral portion has an octagonal cross-section.

20. The apparatus of claim 11 wherein a first portion of said slots in said connecting portion have a generally W-shaped configuration, said first portion of said slots being uniformly circumferentially disposed adjacent said central portion of said coupling spring element.

21. The apparatus of claim 20 wherein a second portion of said slots in connecting portion have a generally U-shaped configuration, said second portion of said slots being uniformly circumferentially disposed adjacent said peripheral portion of said coupling spring element.

22. The apparatus of claim 21 wherein said first and second portions of said slots radially overlap one another and define a plurality of web portions in said connecting portion between said slots.

23. A coupling element for drivingly interconnecting first and second members and for transmitting torque therebetween, said coupling element comprising:
a central portion for driving connection with one of the members;
a peripheral portion for driving connection with the other of the members; and
a radially extending connecting portion interconnecting said central portion and said peripheral portion, said connecting portion having a plurality of slots defined therein, said connecting portion being axially elastic to enable relative axial movement between the members,
said peripheral portion including a first conical surface extending from said connecting portion and extending radially outward away from said connecting portion, said conical surface for radially and axially engaging the other of the members to provide a torque transmitting relationship with the other of the members.

24. The coupling element of claim 23 wherein said central portion includes a second conical surface extending from said connecting portion, said second conical surface tapering radially inward as said second conical surface extends from said connecting portion, said second conical surface for radially and axially engaging the one of the members to provide a torque transmitting relationship with the one of the members.

25. The coupling element of claim 23 wherein at least one of said central portion and said peripheral portion has a polyhedral cross-section.

26. The coupling element of claim 25 wherein said at least one of said central portion and said peripheral portion has a hexagonal cross-section.

27. The coupling element of claim 26 wherein said peripheral portion has an octagonal cross-section.

28. The coupling element of claim 23 wherein a first portion of said slots in said connecting portion have a generally W-shaped configuration, said first portion of said slots being uniformly circumferentially disposed adjacent said central portion of said coupling spring element.

29. The coupling element of claim 28 wherein a second portion of said slots in connecting portion have a generally U-shaped configuration, said second portion of said slots being uniformly circumferentially disposed adjacent said peripheral portion of said coupling spring element.

30. The coupling element of claim 29 wherein said first and second portions of said slots radially overlap one another and define a plurality of web portions in said connecting portion between said slots.

* * * * *